(12) United States Patent
Shen (10) Patent No.: US 12,023,848 B2
(45) Date of Patent: Jul. 2, 2024

(54) PIPE EXPANDING PLIER

(71) Applicants: ZHUJI ITOP HARDWARE TOOLS CO., LTD., Shaoxing (CN); ZHEJIANG IWISS ELECTRIC CO., LTD., Leqing (CN)

(72) Inventor: Yuejuan Shen, Zhuji (CN)

(73) Assignees: ZHEJIANG IWISS ELECTRIC CO., LTD., Liqing (CN); ZHUJI ITOP HARDWARE TOOLS CO., LTD., Shaoxing (CN)

( * ) Notice: Subject to any disclaimer, the term of this patent is extended or adjusted under 35 U.S.C. 154(b) by 0 days.

(21) Appl. No.: 17/664,593

(22) Filed: May 23, 2022

(65) Prior Publication Data

US 2023/0339167 A1    Oct. 26, 2023

(30) Foreign Application Priority Data

Apr. 21, 2022   (CN) .......................... 202220929045.7
Apr. 25, 2022   (CN) .......................... 202220967427.9
Apr. 26, 2022   (CN) .......................... 202220978445.7

(51) Int. Cl.
  *B29C 57/04*   (2006.01)
  *B25B 7/10*    (2006.01)

(52) U.S. Cl.
  CPC ............... *B29C 57/04* (2013.01); *B25B 7/10* (2013.01)

(58) Field of Classification Search
  CPC .......... B25B 7/10; B21D 39/20; B21D 41/02; B21D 41/028
  USPC ........................................................ 425/392
  See application file for complete search history.

(56) References Cited

U.S. PATENT DOCUMENTS 9,555,577 B2 *   1/2017   Greding ................. B21D 39/20
2016/0361864 A1 * 12/2016  Dickert .................. B29C 57/04

FOREIGN PATENT DOCUMENTS

| CN | 112848250 A  | * | 5/2021  | ............ B29C 57/04 |
| CN | 112848251 A  | * | 5/2021  | ............ B29C 57/04 |
| EP | 1118401 A1   | * | 7/2001  | ............ B21D 41/02 |
| EP | 1938950 A1   | * | 7/2008  | ............ B21D 39/20 |
| WO | WO-2020065027 A1 | * | 4/2020 | ........... B21D 41/028 |

* cited by examiner

*Primary Examiner* — Jeffrey M Wollschlager
*Assistant Examiner* — Xue H Liu
(74) *Attorney, Agent, or Firm* — Schwegman Lundberg & Woessner, P.A.

(57) ABSTRACT

A pipe expanding plier is disclosed, and it includes a fixed handle, a movable handle, a mounting base, a pipe expanding head, and a pushing cone. One end of the pushing cone is provided with a rotating shaft, which is connected with the movable handle through a block. The mounting base is provided with a cavity. A gear ring, a gear ring shell and a shell reset element are provided in the cavity, and the gear ring is connected to the rotating shaft, and the gear ring is located in the gear ring shell, and a pawl assembly is provided in the gear ring shell, a reset block and a linkage block are provided on the gear ring shell, the shell reset element is arranged between the reset block and an inner wall of the cavity, and the linkage block extends out of the cavity to be matched with the movable handle.

15 Claims, 11 Drawing Sheets

PIPE EXPANDING PLIER

CROSS-REFERENCE TO RELATED APPLICATIONS

This Non-provisional application claims priority under 35 U.S.C. § 119(a) to Chinese Patent Application No. 202220929045.7, filed on Apr. 21, 2022, and to Chinese Patent Application No. 202220967427.9, filed Apr. 25, 2022, and to Chinese Patent Application No. 202220978445.7, filed Apr. 26, 2022, the entire contents of which are hereby incorporated by reference in its entirety.

TECHNICAL FIELD

The disclosure relates to a pipe expanding tool, and specifically to a pipe expanding plier.

BACKGROUND ART

Pipeline expansion tools are widely used in a field of pipelines, such as in domestic hot and cold water pipelines and domestic heating pipes, in which it is necessary to expand a flexible pipe with extensibility, so that the expanded flexible pipe can be sleeved on another joint to realize installation and connection of pipelines.

Figure 1:
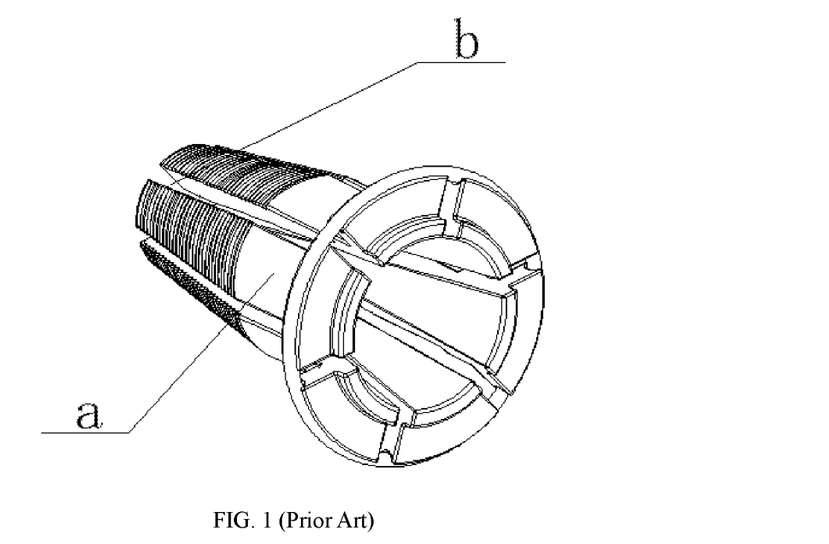
FIG. 1 is a schematic diagram of a pipe expanding element in the background art when it expands.
Figure 2:
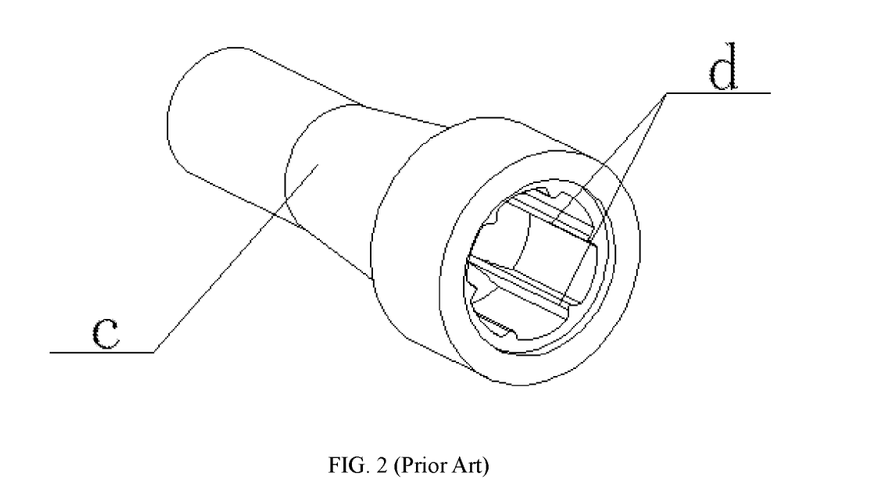
FIG. 2 is a schematic diagram of a pipeline in the background art after being expanded without rotation by an existing pipe expanding plier.
Figure 3:
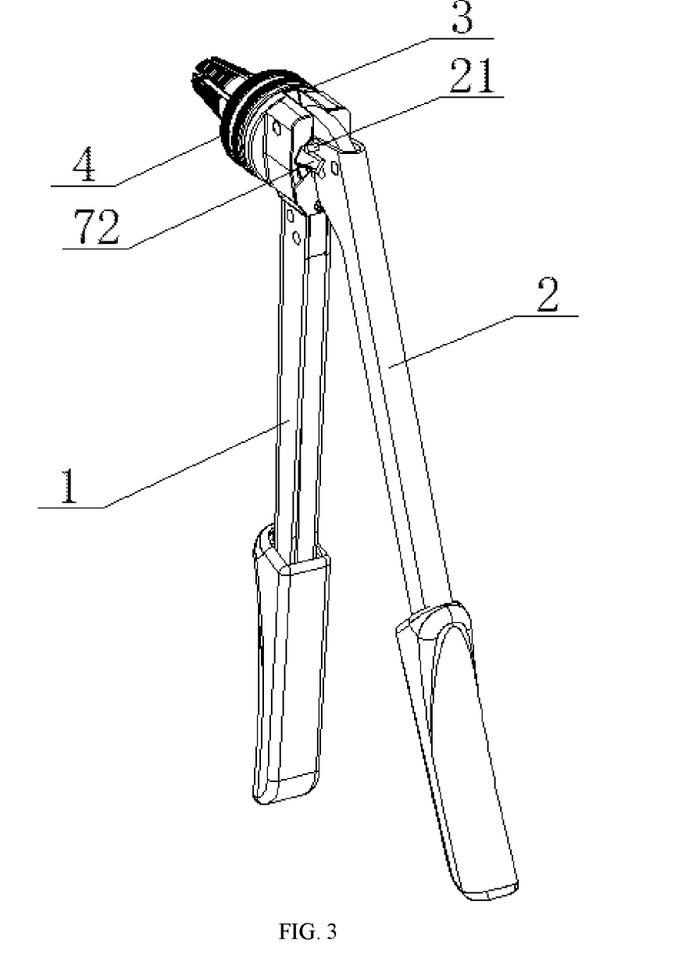
FIG. 3 is a perspective view of a pipe expanding plier of Embodiment 1 of the disclosure.
Figure 4:
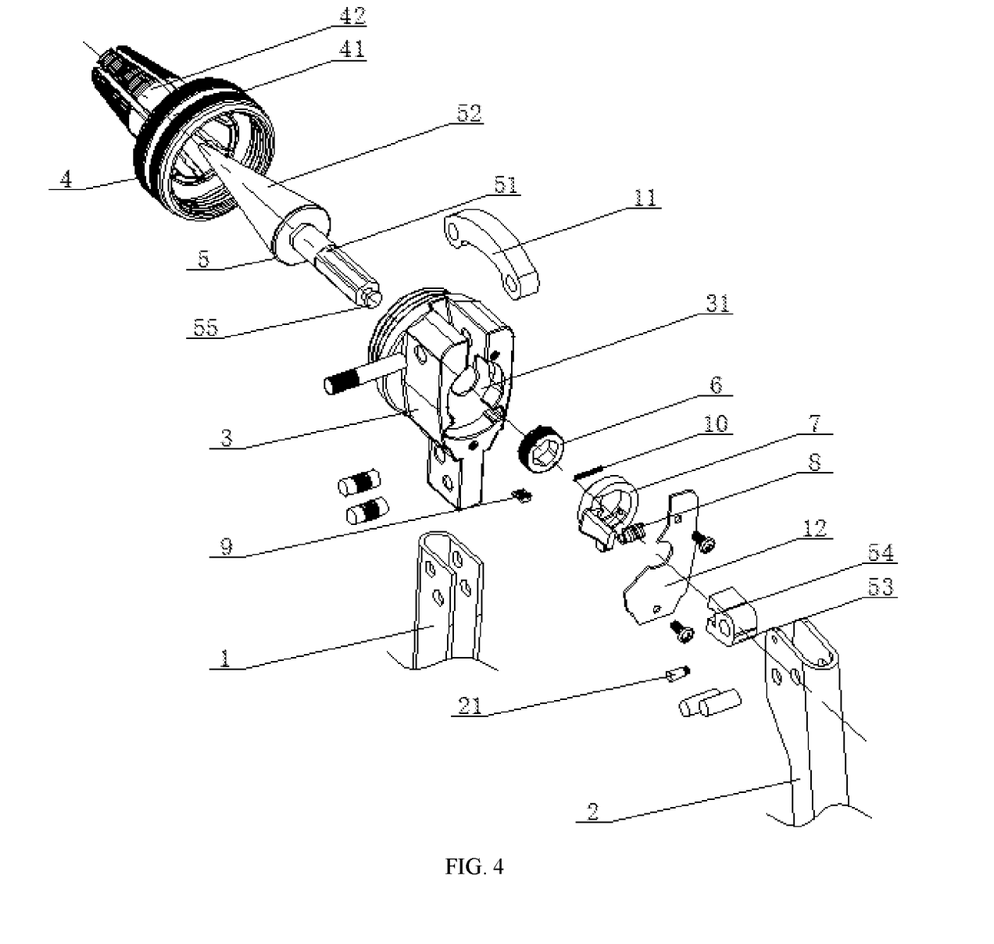
FIG. 4 is an exploded view of a pipe expanding plier of Embodiment 1 of the disclosure.
Figure 5:
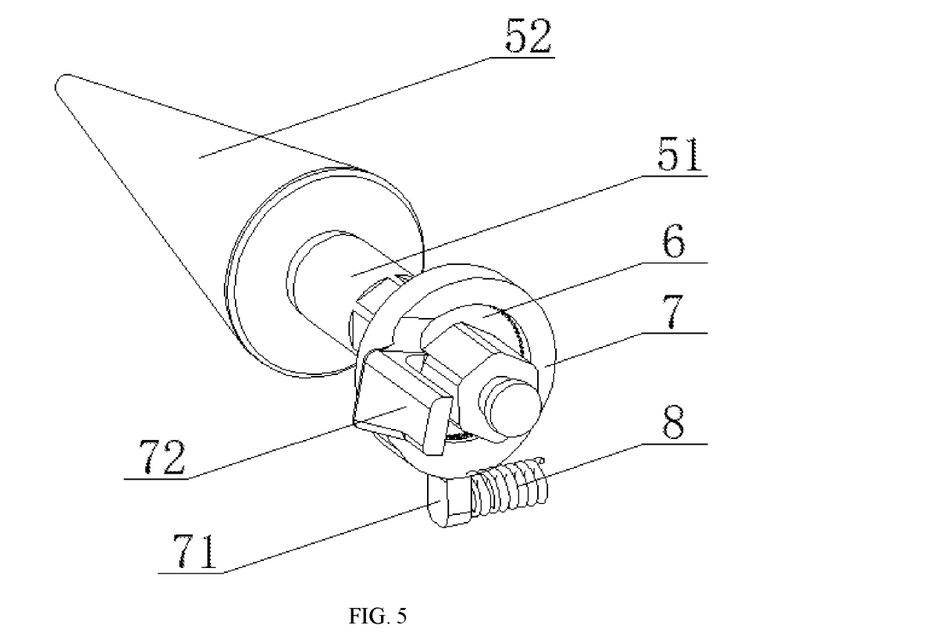
FIG. 5 is a structural perspective view of the pushing cone being driven to rotate in Embodiment 1 of this disclosure.
Figure 6:
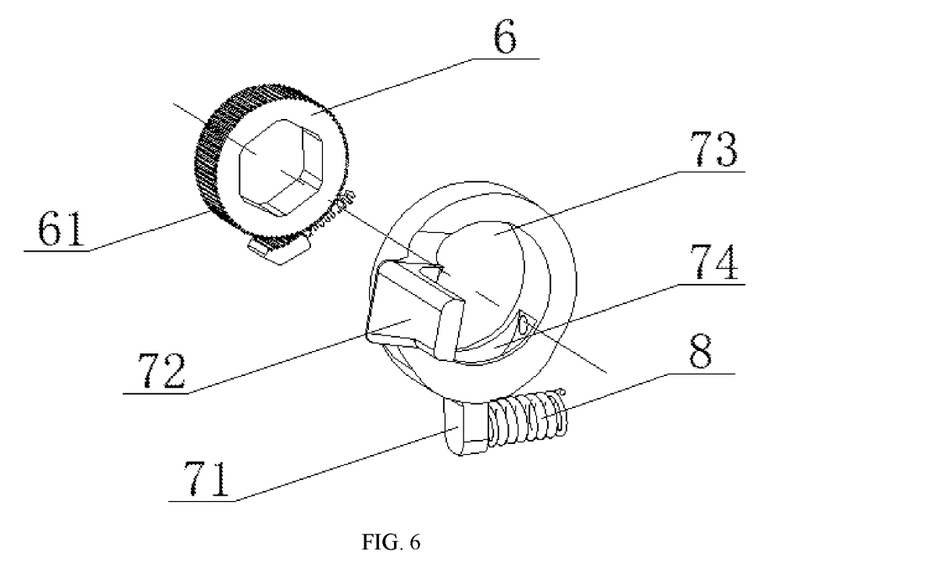
FIG. 6 is an exploded view of the pushing cone being driven to rotate in Embodiment 1 of this disclosure.
Figure 7:
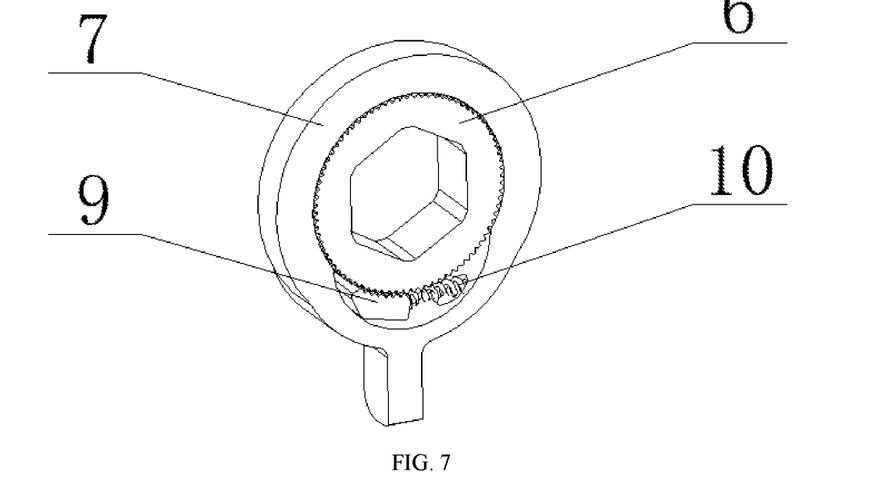
FIG. 7 is an internal structural view of the pushing cone being driven to rotate in Embodiment 1 of this disclosure.
Figure 8:
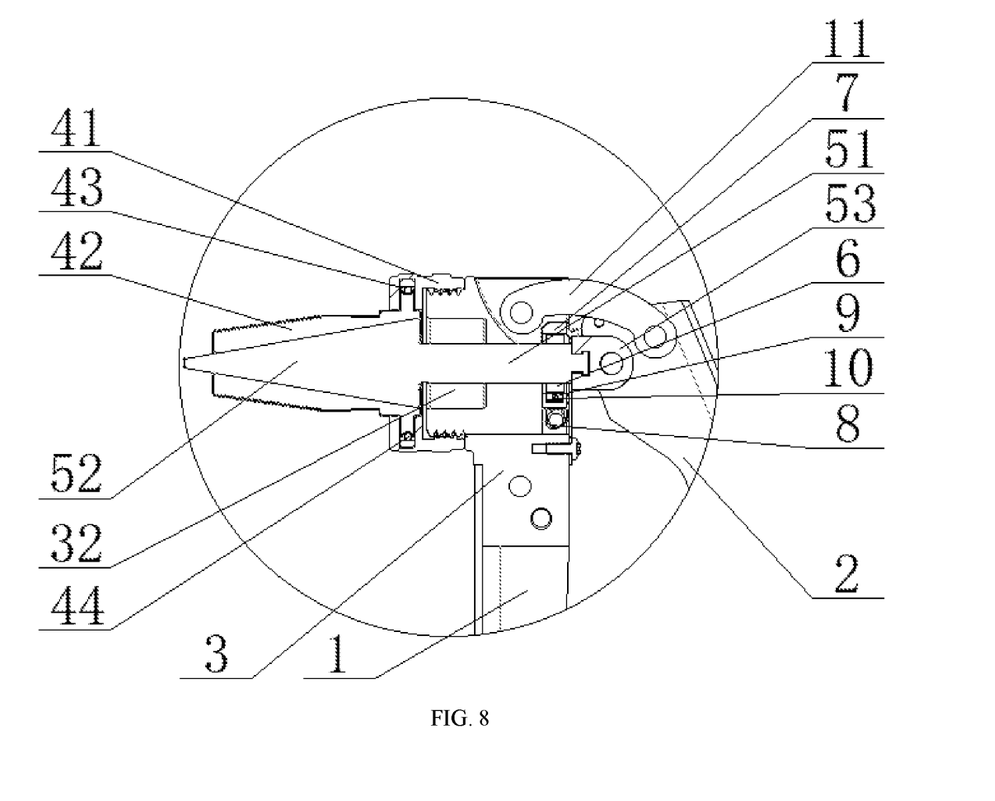
FIG. 8 is a partial cross-sectional view of a pipe expanding plier of Embodiment 1 of the disclosure.

For existing pipe expanding pliers, a pipe expanding head is separated when expanding a pipe. As shown in FIGS. 1 and 2, there will be a gap b between respective pipe expanding elements a after the pipe expanding head is separated, and a boss d can be formed at a part of an inner hole of the pipe C corresponding to the gap. In practice, many pipeline products can't be expanded to a required size at a time, and repeated operations are needed to meet size requirements. However, the repeated operations will make boss phenomenon more obvious, so it is necessary for a user to turn an expanding head to another position every time the expanding head is expanded, so as to avoid a boss problem in the inner hole of the pipe. However, this will undoubtedly increase working processes; and often the user forgets to turn the expanding head, resulting in disqualification and increasing a reject rate.

SUMMARY

To solve the above problems, the technical scheme provided in the disclosure is as follows:

A pipe expanding plier includes a fixed handle, a movable handle, a mounting base connected to the fixed handle, a pipe expanding head connected to the mounting base and a pushing cone connected to the mounting base. One end of the pushing cone is provided with a rotating shaft, and the rotating shaft is connected with the movable handle through a rotating shaft connecting block. The mounting base is provided with a first cavity. A gear ring, a gear ring shell and a shell reset element are provided in the first cavity, and the gear ring is connected to the rotating shaft, and the gear ring is located in the gear ring shell, and a pawl assembly cooperated with the gear ring is further provided in the gear ring shell, a reset block and a linkage block are provided on the gear ring shell, the shell reset element is arranged between the reset block and an inner wall of the first cavity, and the linkage block extends out of the first cavity to be cooperated with the movable handle.

It is further provided in the disclosure that the gear ring shell is provided with an opening, the gear ring is arranged in the opening, a side of the opening is provided with a groove, the pawl assembly is arranged in the groove, an outer periphery of the gear ring is provided with external teeth, and the pawl assembly includes a pawl and a pawl reset element. The pawl is connected with the gear ring, and the pawl reset element is arranged between the pawl and an inner wall of the groove.

It is further provided in the disclosure that a hinge is connected between the movable handle and the mounting base, the movable handle is provided with a protruding shaft, and the linkage block is arranged on a movement path of the protruding shaft along with opening of the movable handle.

It is further provided in the disclosure that a side of the first cavity proximate to the movable handle is fixed with a sealing plate, a gap for the linkage block to act is reserved between the sealing plate and the first cavity, the rotating shaft connecting block is hinged with the movable handle by a pin shaft, the rotating shaft connecting block is provided with a movable groove, and the rotating shaft is provided with a limiting block which is connected in the movable groove.

It is further provided in the disclosure that the mounting base is provided with a second cavity, another end of the pushing cone is provided with a tip cone, the pipe expanding head is connected to an outer wall of the second cavity, the tip cone is located in the second cavity, and the tip cone moves between the pipe expanding head and the mounting base along with rotation of the movable handle.

It is further provided in the disclosure that the pipe expanding head includes a connecting seat and at least two pipe expanding elements. The connecting seat is connected to the outer wall of the second cavity, an annular positioning groove is provided on the connecting seat, and an annular elastic element is provided in the annular positioning groove, and the pipe expanding elements are movably connected to an inner periphery of the annular positioning groove respectively, and the annular elastic element is circumferentially disposed on the pipe expanding elements.

It is further provided in the disclosure that the shell reset element is a compression spring, one end of the compression spring abuts against the reset block, and the other end of the compression spring abuts against the inner wall of the first cavity.

It is further provided in the disclosure that the shell reset element is a torsion spring, the torsion spring is sleeved on the rotating shaft, one end of torsion spring is connected to the mounting base, and the other end of torsion spring is cooperated with the reset block.

In the pipe expanding plier described above, with provision of the gear ring, the gear ring shell, the shell reset element and the pawl assembly on the rotating shaft of the pushing cone, rotation of the pipe expanding head during one opening the pipe expanding plier can be realized, and it is specifically as follows.

1. When the movable handle is opened, the protruding shaft on the movable handle pushes the linkage block to cause the gear ring shell rotate forward, and the shell reset element is gradually compressed. The pawl assembly composed of the pawl and the pawl reset element causes the gear ring to rotate with the gear ring shell, so as to drive the rotating shaft to rotate, thus causing the pushing cone to rotate. With a contraction force of the annular elastic element to the pipe expanding elements, inner surfaces of the pipe expanding elements are tightly attached to the tip cone of the pushing cone, so that the respective pipe expanding elements rotate with rotation of the pushing cone.

During opening of the movable handle, the rotating shaft of the pushing cone is pulled by the movable handle at the same time, and the pushing cone is gradually separated from the pipe expanding head, and the pipe expanding elements stop rotating after the pushing cone is completely separated from the respective pipe expanding elements of the pipe expanding head.

2. When the movable handle is closed, the linkage block is out of pressing of the protruding shaft, and the gear ring shell rotates reversely to reset to an initial position under action of the shell reset element. During reverse rotation of the gear ring shell, the pawl assembly composed of the pawl and the pawl reset element is only in surface contact with the gear ring but does not drive the gear ring to rotate, and the pushing cone naturally does not rotate. During closing of the movable handle, the rotating shaft of the pushing cone is pushed by the movable handle at the same time, and the pushing cone is gradually pushed into the pipe expanding head, so that respective pipe expanding elements of the pipe expanding head expands the pipeline, and thus the annular elastic element is expanded.

The movable handle of the pipe expanding plier of the disclosure rotates a certain angle after each opening of the pipe expanding head, so that a user can operate continuously, and it is not necessary to rotate the pipe expanding head after each expansion action, which reduces operation procedures and improves operation efficiency of the user; meanwhile, a boss of an inner hole of the pipeline can be prevented from affecting connection quality of the pipeline, and connection reliability of the pipeline can be improved. In addition, expansion of the pipe expanding head for the pipe expanding plier is originally made by opening or closing the movable handle, and rotation of the pipe expanding head can be realized by opening and closing of the movable handle without other operations, which is very convenient.

A pipe expanding plier includes a fixed handle, a movable handle, a mounting base connected to the fixed handle, a pipe expanding head connected to the mounting base and a pushing cone connected to the mounting base. One end of the pushing cone is provided with a rotating shaft, and the rotating shaft is connected with the movable handle through a rotating shaft connecting block. The mounting base is provided with a first cavity. A turntable and a turntable reset element are provided in the first cavity, the turntable is connected to the rotating shaft. A reset block and a linkage block are provided on the turntable, the turntable is arranged between the reset block and an inner wall of the first cavity, and the linkage block extends out of the first cavity to be cooperated with the movable handle.

It is further provided in the disclosure that a hinge is connected between the movable handle and the mounting base, the movable handle is provided with a protruding shaft, and the linkage block is arranged on a movement path of the protruding shaft along with opening of the movable handle.

It is further provided in the disclosure that a side of the first cavity proximate to the movable handle is fixed with a sealing plate, a gap for the linkage block to act is reserved between the sealing plate and the first cavity, the rotating shaft connecting block is hinged with the movable handle by a pin shaft, the rotating shaft connecting block is provided with a movable groove, and the rotating shaft is provided with a limiting block which is connected in the movable groove.

It is further provided in the disclosure that the mounting base is provided with a second cavity, another end of the pushing cone is provided with a tip cone, the pipe expanding head is connected to an outer wall of the second cavity, the tip cone is located in the second cavity, and the tip cone moves between the pipe expanding head and the mounting base along with rotation of the movable handle.

It is further provided in the disclosure that the pipe expanding head includes a connecting seat and at least two pipe expanding elements. The connecting seat is connected to the outer wall of the second cavity, an annular positioning groove is provided on the connecting seat, and an annular elastic element is provided in the annular positioning groove, and the pipe expanding elements are movably connected to an inner periphery of the annular positioning groove respectively, and the annular elastic element is circumferentially disposed on the pipe expanding elements.

It is further provided in the disclosure that the turntable reset element is a compression spring, one end of the compression spring abuts against the reset block, and the other end of the compression spring abuts against the inner wall of the first cavity.

It is further provided in the disclosure that the turntable reset element is a torsion spring, the torsion spring is sleeved on the rotating shaft, one end of torsion spring is connected to the mounting base, and the other end of torsion spring is cooperated with the reset block.

In the pipe expanding plier described above, with provision of the turntable and the turntable reset element on the rotating shaft of the pushing cone, rotation of the pipe expanding head during one opening the pipe expanding plier can be realized, and it is specifically as follows.

1. When the movable handle is opened, the protruding shaft on the movable handle pushes the linkage block to cause the turntable rotate forward, and the turntable reset element is gradually compressed, so as to drive the rotating shaft to rotate, thus causing the pushing cone to rotate. With a contraction force of the annular elastic element to the pipe expanding elements, inner surfaces of the pipe expanding elements are tightly attached to the tip cone of the pushing cone, so that the respective pipe expanding elements rotate with rotation of the pushing cone. During opening of the movable handle, the rotating shaft of the pushing cone is pulled by the movable handle at the same time, and the pushing cone is gradually separated from the pipe expanding head, and the pipe expanding elements stop rotating after the pushing cone is completely separated from the respective pipe expanding elements of the pipe expanding head.

2. When the movable handle is closed, the linkage block is out of pressing of the protruding shaft, and the turntable rotates reversely under action of the turntable reset element. During closing of the movable handle, the rotating shaft of the pushing cone of the movable handle is pushed by the movable handle at the same time, and the pushing cone is gradually pushed into the pipe expanding head. However, during reverse rotation of the turntable, a certain friction force is generated between the respective pipe expanding elements of the pipe expanding head and the inner hole of the pipeline, so that the pipe expanding elements do not rotate during an expansion. However, the tip cone of the pushing cone closely adheres to the inner surfaces of the pipe expanding elements to generate a certain friction force, causing the turntable not to be completely reset, and the turntable reset is still in a certain compressed state. The tip cone of the pushing cone expands the respective pipe expanding elements of the pipe expanding head, thus expanding the pipeline and expanding the annular elastic element.

Although the pipe expanding plier of the disclosure adopts a rotatable and resettable structure with the turntable and the turntable reset element so that the turntable rotates reversely when the movable handle is closed, but in actual use, due to an increased friction between the pipe expanding elements and the pipeline during the closing of the movable handle, the pipe expanding elements will not be completely reset, so that there is a certain angle difference between the pipe expanding elements after the movable handle is opened and those after the movable handle is closed, so that the user can operate continuously, and it is not necessary to rotate the pipe expanding head after each expansion action, which reduces operation procedures and improves operation efficiency of the user; meanwhile, a boss of an inner hole of the pipeline can be prevented from affecting connection quality of the pipeline, and connection reliability of the pipeline can be improved. In addition, expansion of the pipe expanding head for the pipe expanding plier is originally made by opening or closing the movable handle, and rotation of the pipe expanding head can be realized by opening and closing of the movable handle without other operations, which is very convenient.

DETAILED DESCRIPTION

In order to further understand contents of the present disclosure, the present disclosure will be described in detail with reference to drawings and examples.

In description of this disclosure, it should be noted that unless otherwise specified and limited, terms "installing", "coupling" and "connecting" should be understood broadly, for example, it can be "fixedly connecting", "integrally connecting", or "detachably connecting"; or it can be "mechanically connecting" or "electrically connecting", or it can be "communicating within two elements"; or it can be "directly connecting" or "indirectly connecting through an intermediate medium", and specific meanings of the above terms can be understood according to specific situations for ordinary shilled in the art.

Embodiment 1

Referring to FIGS. 3 to 8, a technical scheme of the disclosure is a pipe expanding plier, which includes a fixed handle 1, a movable handle 2, a mounting base 3 connected to the fixed handle 1, a pipe expanding head 4 connected to the mounting base 3 and a pushing cone 5 connected to the mounting base 3. One end of the pushing cone 5 is provided with a rotating shaft 51, and the rotating shaft 51 is connected with the movable handle 2 through a rotating shaft connecting block 53. The mounting base 3 is provided with a first cavity 31. A gear ring 6, a gear ring shell 7 and a shell reset element 8 are provided in the first cavity 31, and the gear ring 6 is connected to the rotating shaft 51, and the gear ring 6 is located in the gear ring shell 7, and a pawl assembly cooperated with the gear ring 6 is further provided in the gear ring shell 7, a reset block 71 and a linkage block 72 are provided on the gear ring shell 7, the shell reset element 8 is arranged between the reset block 71 and an inner wall of the first cavity 31, and the linkage block 72 extends out of the first cavity 31 to be cooperated with the movable handle 2.

In this embodiment, the gear ring shell 7 is provided with an opening 73, the gear ring 6 is arranged in the opening 73, a side of the opening 73 is provided with a groove 74, the pawl assembly is arranged in the groove 74, an outer periphery of the gear ring 6 is provided with external teeth 61, and the pawl assembly includes a pawl 9 and a pawl reset element 10. The pawl 9 is connected with the outer teeth 61 on the gear ring 6, and the pawl reset element 10 is arranged between the pawl 9 and an inner wall of the groove 74.

In this embodiment, a hinge 11 is connected between the movable handle 2 and the mounting base 3, the movable handle 2 is provided with a protruding shaft 21, and the linkage block 72 is arranged on a movement path of the protruding shaft 21 along with opening of the movable handle 2. When the movable handle is opened, the protruding shaft on the movable handle drives the gear ring shell to rotate through the linkage block.

In this embodiment, a side of the first cavity 31 proximate to the movable handle 2 is fixed with a sealing plate 12, a gap for the linkage block 72 to act is reserved between the sealing plate 12 and the first cavity 31. The sealing plate can prevent components arranged in the first cavity from being influenced by the outside, and ensure reliability of matching of the components inside the first cavity.

In this embodiment, the mounting base 3 is provided with a second cavity 32, another end of the pushing cone 5 is provided with a tip cone 52, the pipe expanding head 4 is connected to an outer wall of the second cavity 32, The tip cone 52 is located in the second cavity 32, and the tip cone 52 moves between the pipe expanding head 4 and the mounting base 3 along with rotation of the movable handle 2.

In this embodiment, the pipe expanding head 4 includes a connecting seat 41 and six pipe expanding elements 42. The connecting seat 41 is connected to the outer wall of the second cavity 32, an annular positioning groove 43 is provided on the connecting seat 41, and an annular elastic element 44 is provided in the annular positioning groove 43, and the pipe expanding elements 42 are movably connected to an inner periphery of the annular positioning groove 43 respectively, and the annular elastic element 44 is circumferentially disposed on the pipe expanding elements 42. The annular elastic element surrounds the respective pipe expanding elements to cause the pipe expanding head to expand and then apply a restoring force to the respective pipe expanding elements to realize resetting of the pipe expanding elements, and a force of the annular elastic element on the pipe expanding elements can make the pipe expanding elements rotate with the tip cone.

In this embodiment, a part where the rotating shaft 51 is connected with the gear ring 6 is a polygonal square shaft, so that the gear ring 6 rotates to drive the rotating shaft 51 to rotate.

In this embodiment, the pawl 9 and the pawl reset member 10 constitute a pawl assembly, and the pawl assembly cooperates with the gear ring 6 to realize one-way intermittent movement of the gear ring 6.

In this embodiment, the rotating shaft connecting block 53 is hinged with the movable handle 2 by a pin shaft, the rotating shaft connecting block 53 is provided with a movable groove 54, and the rotating shaft 51 is provided with a limiting block 55 which is connected in the movable groove 54, so that the pushing cone can rotate when the movable handle 2 pushes or pulls to move the pushing cone 5.

In this embodiment, the pawl reset member 10 adopts a compression spring, and the annular elastic member 44 adopts an annular tightening spring.

In this embodiment, the shell reset element 8 is a compression spring, one end of the compression spring abuts against the reset block 71, and the other end of the compression spring abuts against the inner wall of the first cavity 31.

Figure 9:
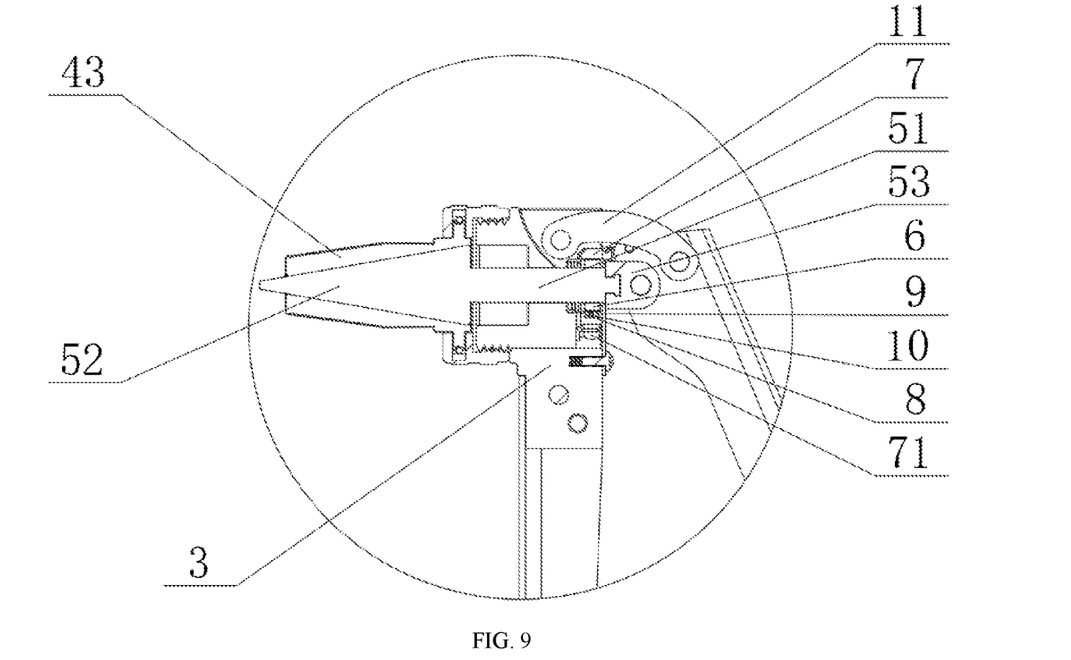
FIG. 9 is another partial cross-sectional view of pipe expanding plier of Embodiment 1 of the disclosure.
Figure 10:
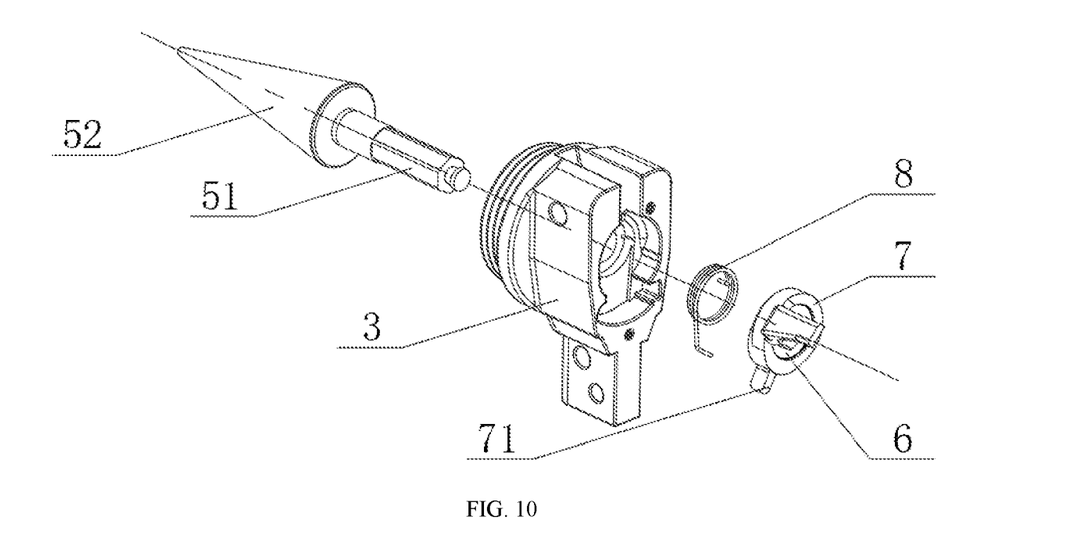
FIG. 10 is another exploded view of the pushing cone being driven to rotate in Embodiment 1 of this disclosure.
Figure 11:
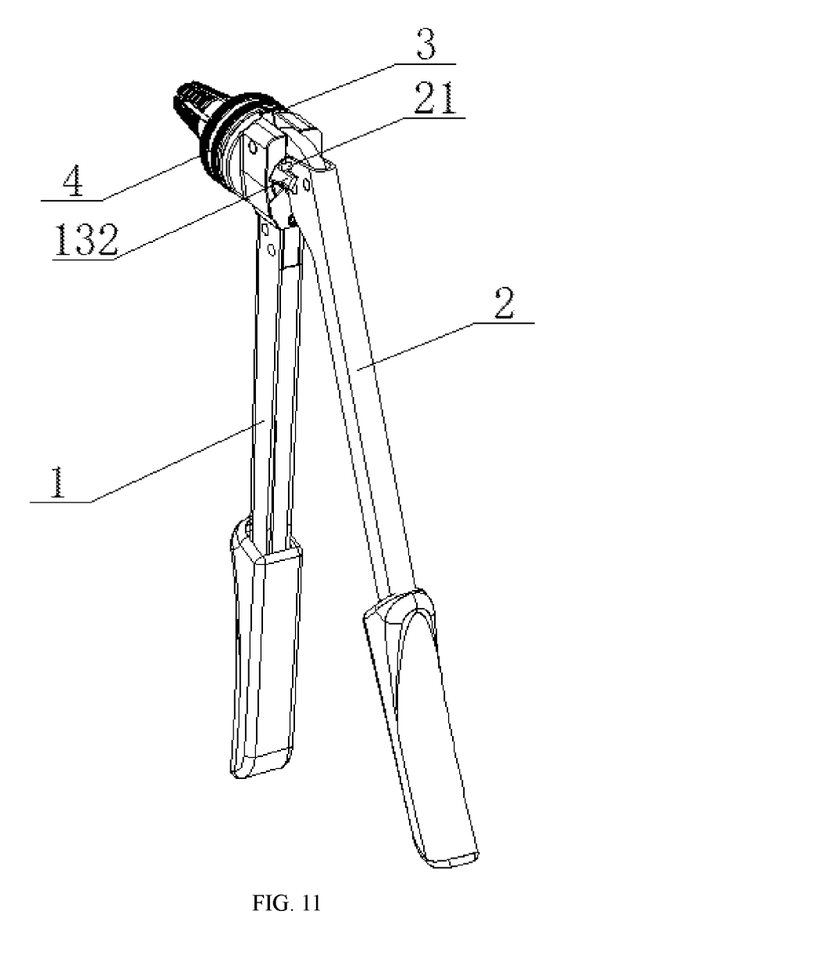
FIG. 11 is a perspective view of a pipe expanding plier of Embodiment 2 of the disclosure.
Figure 12:
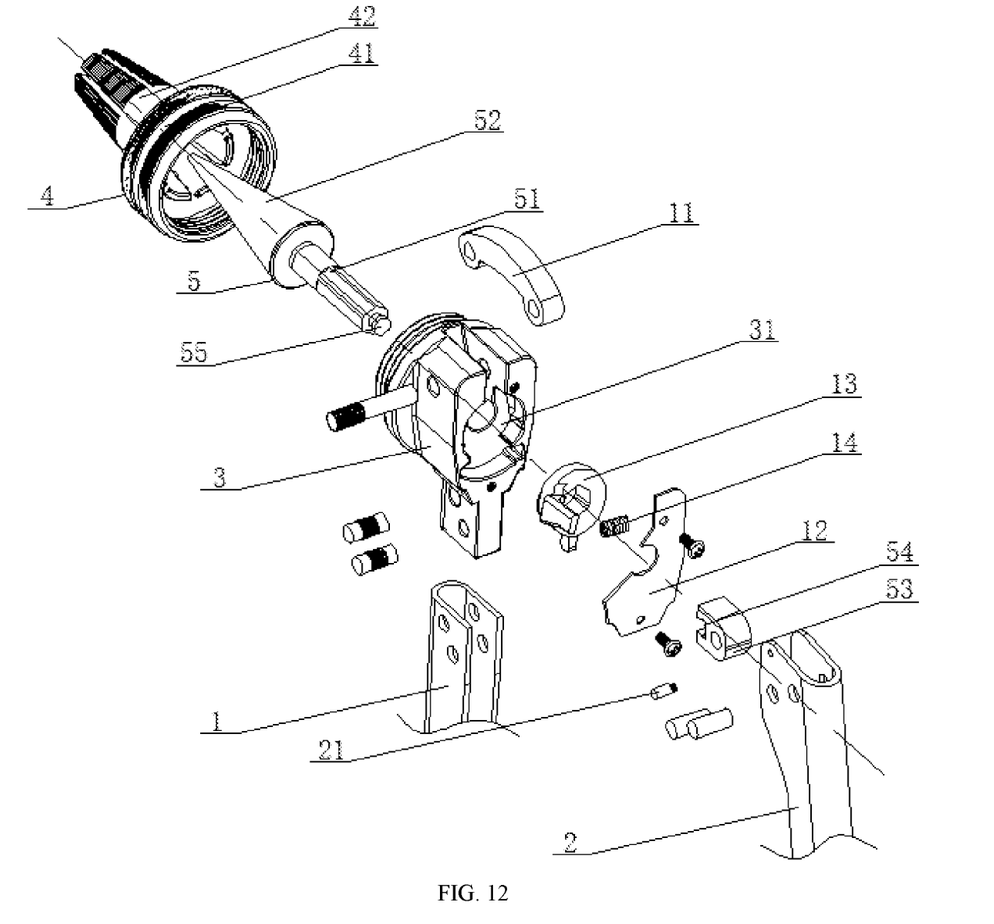
FIG. 12 is an exploded view of a pipe expanding plier of Embodiment 2 of the disclosure.
Figure 13:
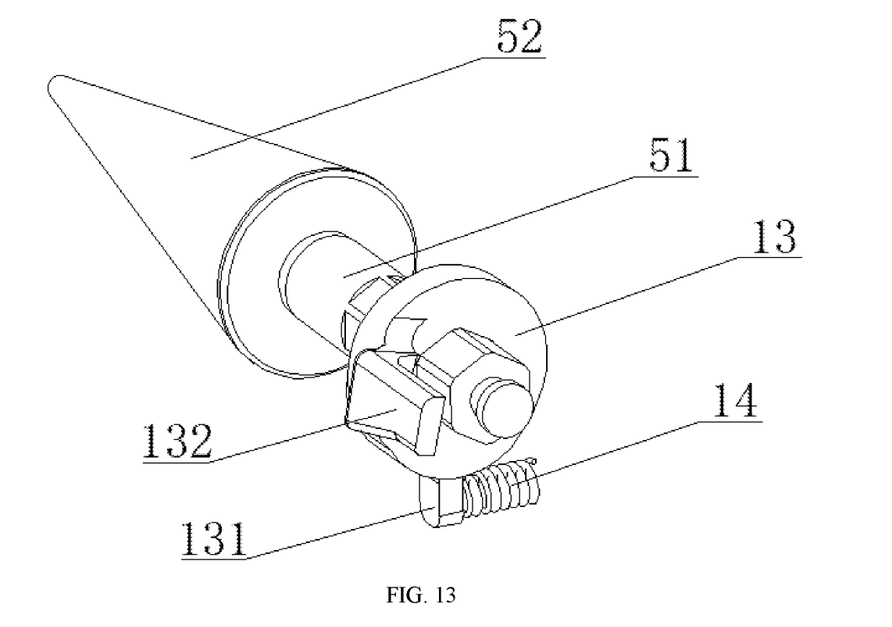
FIG. 13 is a structural perspective view of the pushing cone being driven to rotate in Embodiment 2 of this disclosure.
Figure 14:
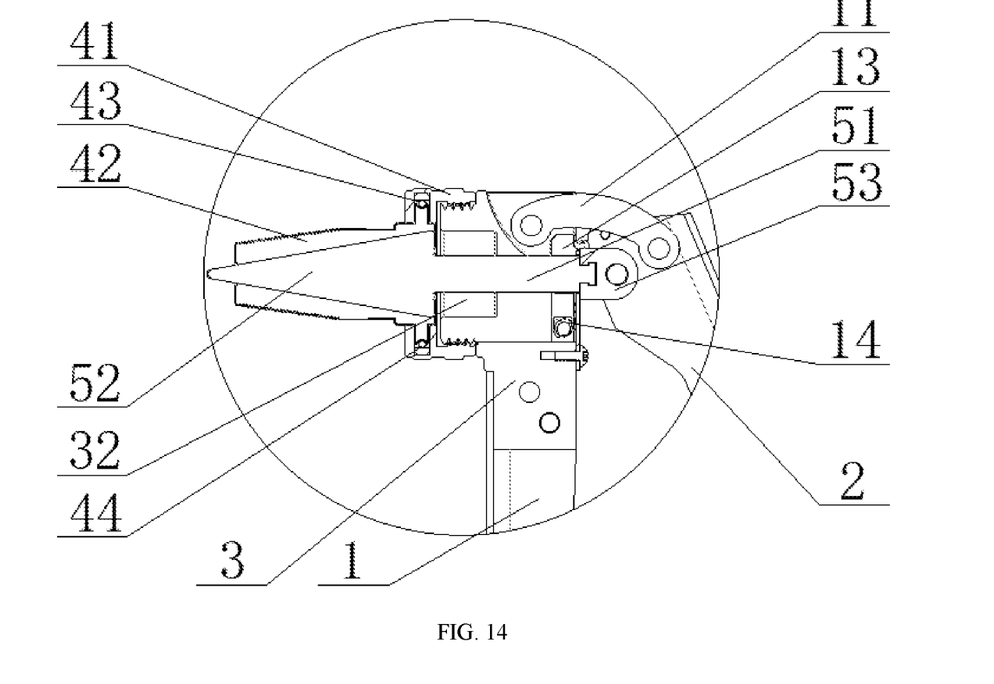
FIG. 14 is a partial cross-sectional view of a pipe expanding plier of Embodiment 2 of the disclosure.

In another embodiment, as shown in FIGS. 9 and 10, the shell reset element 8 is a torsion spring, the torsion spring is sleeved on the rotating shaft 51, one end of torsion spring is connected to the mounting base 3, and the other end of torsion spring is cooperated with the reset block 71.

The pipe expanding plier in this embodiment operates specifically as follows.
1. When the movable handle is opened, the protruding shaft on the movable handle pushes the linkage block to cause the gear ring shell rotate forward, and the shell reset element is gradually compressed. The pawl assembly composed of the pawl and the pawl reset element causes the gear ring to rotate with the gear ring shell, so as to drive the rotating shaft to rotate, thus causing the pushing cone to rotate. With a contraction force of the annular elastic element to the pipe expanding elements, inner surfaces of the pipe expanding elements are tightly attached to the tip cone of the pushing cone, so that the respective pipe expanding elements rotate with rotation of the pushing cone. During opening of the movable handle, the rotating shaft of the pushing cone is pulled by the movable handle at the same time, and the pushing cone is gradually separated from the pipe expanding head, and the pipe expanding elements stop rotating after the pushing cone is completely separated from the respective pipe expanding elements of the pipe expanding head.
2. When the movable handle is closed, the linkage block is out of pressing of the protruding shaft, and the gear ring shell rotates reversely to reset to an initial position under action of the shell reset element. During reverse rotation of the gear ring shell, the pawl assembly composed of the pawl and the pawl reset element is only in surface contact with the gear ring but does not drive the gear ring to rotate, and the pushing cone naturally does not rotate. During closing of the movable handle, the rotating shaft of the pushing cone is pushed by the movable handle at the same time, and the pushing cone is gradually pushed into the pipe expanding head, so that respective pipe expanding elements of the pipe expanding head expands the pipeline, and thus the annular elastic element is expanded.

Figure 17:
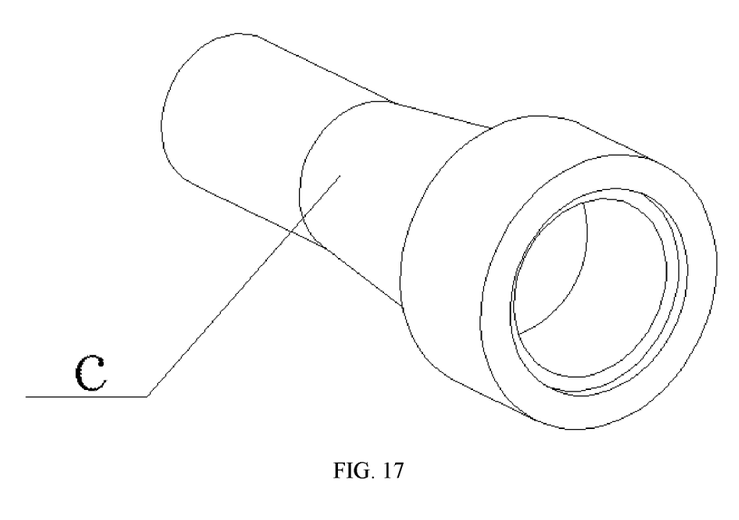
FIG. 17 is a schematic diagram of the pipeline after being expanded by the pipe expanding plier of Embodiment 1 or Embodiment 2 of the disclosure.

The movable handle of the pipe expanding plier of the disclosure rotates a certain angle after each opening of the pipe expanding head, so that a user can operate continuously, and it is not necessary to rotate the pipe expanding head after each expansion action, which reduces operation procedures and improves operation efficiency of the user. The pipeline expanded by using the pipe expanding plier of Embodiment 1 is as shown in FIG. 17, with no boss in the inner hole of the pipe c, the boss of an inner hole of the pipeline can be prevented from affecting connection quality of the pipeline, and connection reliability of the pipeline can be improved. In addition, expansion of the pipe expanding head for the pipe expanding plier is originally made by opening or closing the movable handle, and rotation of the pipe expanding head can be realized by opening and closing of the movable handle without other operations, which is very convenient.

Embodiment 2

Referring to FIGS. 11 to 14, the technical scheme of this disclosure is a pipe expanding plier, which includes a fixed handle 1, a movable handle 2, a mounting base 3 connected to the fixed handle 1, a pipe expanding head 4 connected to the mounting base 3 and a pushing cone 5 connected to the mounting base 3. One end of the pushing cone 5 is provided with a rotating shaft 51, and the rotating shaft 51 is connected with the movable handle 2 through a rotating shaft connecting block 53. The mounting base 3 is provided with a first cavity 31. A turntable 13 and a turntable reset element 14 are provided in the first cavity 31, the turntable 13 is connected to the rotating shaft 51. A reset block 131 and a linkage block 132 are provided on the turntable 13, the turntable 14 is arranged between the reset block 131 and an inner wall of the first cavity 31, and the linkage block 132 extends out of the first cavity 31 to be cooperated with the movable handle 2.

In this embodiment, a hinge 11 is connected between the movable handle 2 and the mounting base 3, the movable handle 2 is provided with a protruding shaft 21, and the linkage block 132 is arranged on a movement path of the protruding shaft 21 along with opening of the movable handle 2. When the movable handle is opened, the protruding shaft on the movable handle drives the turntable to rotate through the linkage block.

In this embodiment, a side of the first cavity 31 proximate to the movable handle 2 is fixed with a sealing plate 12, a gap for the linkage block 132 to act is reserved between the sealing plate 12 and the first cavity 31. The sealing plate can prevent components arranged in the first cavity from being influenced by the outside, and ensure reliability of matching of the components inside the first cavity.

In this embodiment, the mounting base 3 is provided with a second cavity 32, another end of the pushing cone 5 is provided with a tip cone 52, the pipe expanding head 4 is connected to an outer wall of the second cavity 32, The tip cone 52 is located in the second cavity 32, and the tip cone 52 moves between the pipe expanding head 4 and the mounting base 3 along with rotation of the movable handle 2.

In this embodiment, the pipe expanding head 4 includes a connecting seat 41 and six pipe expanding elements 42. The connecting seat 41 is connected to the outer wall of the second cavity 32, an annular positioning groove 43 is provided on the connecting seat 41, and an annular elastic element 44 is provided in the annular positioning groove 43, and the pipe expanding elements 42 are movably connected to an inner periphery of the annular positioning groove 43 respectively, and the annular elastic element 44 is circumferentially disposed on the pipe expanding elements 42. The annular elastic element surrounds the respective pipe expanding elements to cause the pipe expanding head to expand and then apply a restoring force to the respective pipe expanding elements to realize resetting of the pipe expanding elements, and a force of the annular elastic element on the pipe expanding elements can make the pipe expanding elements rotate with the tip cone.

In this embodiment, a part where the rotating shaft 51 is connected with the turntable 13 is a polygonal square shaft, so that the turntable 13 rotates to drive the rotating shaft 51 to rotate.

In this embodiment, the rotating shaft connecting block 53 is hinged with the movable handle 2 by a pin shaft, the rotating shaft connecting block 53 is provided with a movable groove 54, and the rotating shaft 51 is provided with a limiting block 55 which is connected in the movable groove 54, so that the pushing cone can rotate when the movable handle 2 pushes or pulls to move the pushing cone 5.

In this embodiment, the pawl reset member 10 adopts a compression spring, and the annular elastic member 44 adopts an annular tightening spring.

In this embodiment, the turntable reset element 14 is a compression spring, one end of the compression spring abuts against the reset block 71, and the other end of the compression spring abuts against the inner wall of the first cavity 31.

Figure 15:
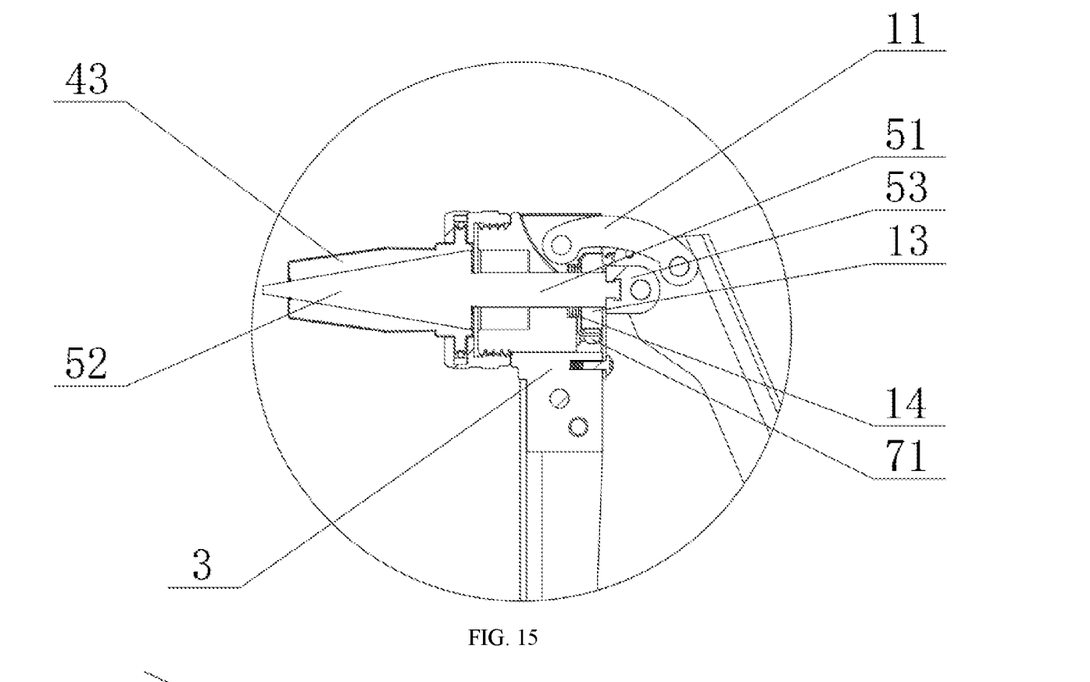
FIG. 15 is another partial cross-sectional view of pipe expanding plier of Embodiment 2 of the disclosure.
Figure 16:
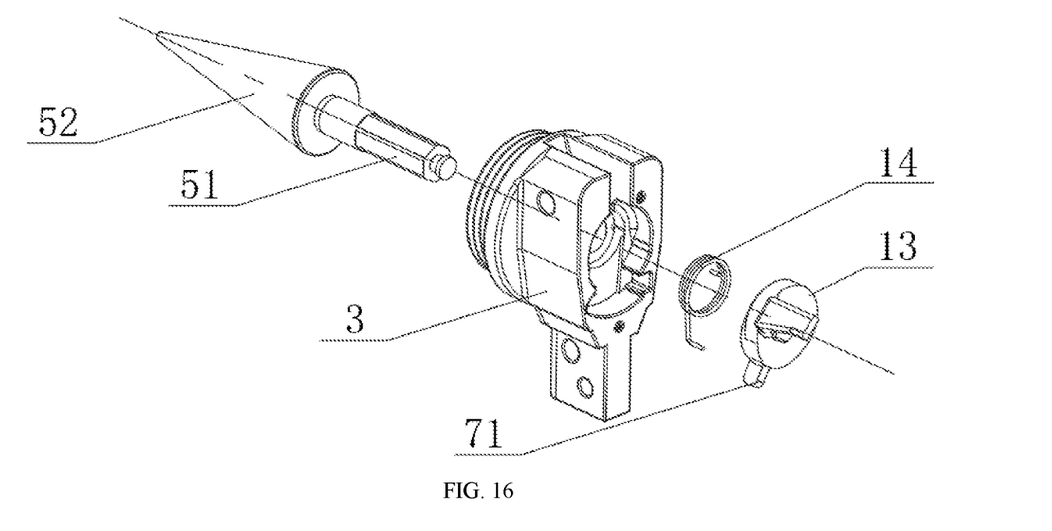
FIG. 16 is another exploded view of the pushing cone being driven to rotate in Embodiment 2 of this disclosure.

In another embodiment, as shown in FIGS. 15 and 16, the shell reset element 14 is a torsion spring, the torsion spring is sleeved on the rotating shaft 51, one end of torsion spring is connected to the mounting base 3, and the other end of torsion spring is cooperated with the reset block 71.

An operation mode of the pipe expanding plier in this embodiment is different from that in Embodiment 1, and compared with Embodiment 1, it lacks the pawl assembly, so that the pushing cone drives the pipe expanding head to reversely rotate a small range after the movable handle is closed, but when in use, the pipe expanding pipe can still rotate at a certain angle before and after the pipe expanding head expands. Its operation mode is specifically as follows.

1. When the movable handle is opened, the protruding shaft on the movable handle pushes the linkage block to cause the turntable rotate forward, and the turntable reset element is gradually compressed, so as to drive the rotating shaft to rotate, thus causing the pushing cone to rotate. With a contraction force of the annular elastic element to the pipe expanding elements, inner surfaces of the pipe expanding elements are tightly attached to the tip cone of the pushing cone, so that the respective pipe expanding elements rotate with rotation of the pushing cone. During opening of the movable handle, the rotating shaft of the pushing cone is pulled by the movable handle at the same time, and the pushing cone is gradually separated from the pipe expanding head, and the pipe expanding elements stop rotating after the pushing cone is completely separated from the respective pipe expanding elements of the pipe expanding head.

2. When the movable handle is closed, the linkage block is out of pressing of the protruding shaft, and the turntable rotates reversely under action of the turntable reset element. During closing of the movable handle, the rotating shaft of the pushing cone of the movable handle is pushed by the movable handle at the same time, and the pushing cone is gradually pushed into the pipe expanding head. However, during reverse rotation of the turntable, a certain friction force is generated between the respective pipe expanding elements of the pipe expanding head and the inner hole of the pipeline, so that the pipe expanding elements do not rotate during an expansion. However, the tip cone of the pushing cone closely adheres to the inner surfaces of the pipe expanding elements to generate a certain friction force, causing the turntable not to be completely reset, and the turntable reset is still in a certain compressed state. The tip cone of the pushing cone expands the respective pipe expanding elements of the pipe expanding head, thus expanding the pipeline and expanding the annular elastic element.

Although the pipe expanding plier of the disclosure adopts a rotatable and resettable structure with the turntable and the turntable reset element so that the turntable rotates reversely when the movable handle is closed, but in actual use, due to an increased friction between the pipe expanding elements and the pipeline during the closing of the movable handle, the pipe expanding elements will not be completely reset, so that there is a certain angle difference between the pipe expanding elements after the movable handle is opened and those after the movable handle is closed, so that the user can operate continuously, and it is not necessary to rotate the pipe expanding head after each expansion action, which reduces operation procedures and improves operation efficiency of the user. The pipeline expanded by using the pipe expanding plier of Embodiment 2 is as shown in FIG. 17, with no boss in the inner hole of the pipe c, a boss of an inner hole of the pipeline can be prevented from affecting connection quality of the pipeline, and connection reliability of the pipeline can be improved. In addition, expansion of the pipe expanding head for the pipe expanding plier is originally made by opening or closing the movable handle, and rotation of the pipe expanding head can be realized by opening and closing of the movable handle without other operations, which is very convenient.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skills in the art inspired by this disclosure without creativity, without departing from the creative purpose of the present disclosure, are all within a protection scope of the present disclosure.

What is claimed is:

1. A pipe expanding plier, comprising a fixed handle, a movable handle, a mounting base connected to the fixed handle, a pipe expanding head connected to the mounting base and a pushing cone connected to the mounting base, wherein one end of the pushing cone is provided with a rotating shaft, and the rotating shaft is connected with the movable handle through a rotating shaft connecting block, the mounting base is provided with a first cavity; a gear ring, a gear ring shell and a shell reset element are provided in the first cavity, and the gear ring is connected to the rotating shaft, and the gear ring is located inside the gear ring shell, and a pawl assembly cooperated with the gear ring is further provided inside the gear ring shell, a reset block and a linkage block are provided at the gear ring shell, the shell reset element is arranged between the reset block and an inner wall of the first cavity, and the linkage block extends out of the first cavity to be cooperated with the movable handle.

2. The pipe expanding plier according to claim 1, wherein the gear ring shell is provided with an opening, the gear ring is arranged inside the opening, a side of the opening is provided with a groove, the pawl assembly is arranged in the groove, an outer periphery of the gear ring is provided with an external teeth, and the pawl assembly comprises a pawl and a pawl reset element, the pawl is connected with the gear ring, and the pawl reset element is arranged between the pawl and an inner wall of the groove.

3. The pipe expanding plier according to claim 1, wherein a hinge is connected between the movable handle and the mounting base, the movable handle is provided with a protruding shaft, and the linkage block is arranged on a movement path of the protruding shaft along with opening of the movable handle.

4. The pipe expanding plier according to claim 1, wherein a side of the first cavity proximate to the movable handle is fixed with a sealing plate, a gap for the linkage block to act is reserved between the sealing plate and the first cavity, the rotating shaft connecting block is hinged with the movable handle by a pin shaft, the rotating shaft connecting block is provided with a movable groove, the rotating shaft is provided with a limiting block, and the limiting block is connected in the movable groove.

5. The pipe expanding plier according to claim 1, wherein the mounting base is provided with a second cavity, another end of the pushing cone is provided with a tip cone, the pipe expanding head is connected to an outer wall of the second cavity, the tip cone is located in the second cavity, and the tip cone moves between the pipe expanding head and the mounting base along with rotation of the movable handle.

6. The pipe expanding plier according to claim 5, wherein the pipe expanding head comprises a connecting seat and at least two pipe expanding elements, the connecting seat being connected to the outer wall of the second cavity, an annular positioning groove being provided on the connecting seat, and an annular elastic element being provided in the annular positioning groove, and the at least two pipe expanding elements being movably connected to an inner periphery of the annular positioning groove respectively, and the annular elastic element being circumferentially disposed on the at least two pipe expanding elements.

7. The pipe expanding plier according to claim 1, wherein the shell reset element is a compression spring, one end of the compression spring abutting against the reset block, and the other end of the compression spring abutting against the inner wall of the first cavity.

8. The pipe expanding plier according to claim 1, wherein the shell reset element is a torsion spring, the torsion spring being sleeved on the rotating shaft, one end of torsion spring being connected to the mounting base, and the other end of torsion spring being cooperated with the reset block.

9. A pipe expanding plier, comprising a fixed handle, a movable handle, a mounting base connected to the fixed handle, a pipe expanding head connected to the mounting base and a pushing cone connected to the mounting base, wherein one end of the pushing cone is provided with a rotating shaft, and the rotating shaft is connected with the movable handle through a rotating shaft connecting block, the mounting base is provided with a first cavity, a turntable and a turntable reset element are provided in the first cavity, the turntable is connected to the rotating shaft, and a reset block and a linkage block are provided on the turntable, the turntable is arranged between the reset block and an inner wall of the first cavity, and the linkage block extends out of the first cavity to be cooperated with the movable handle.

10. The pipe expanding plier according to claim 9, wherein a hinge is connected between the movable handle and the mounting base, the movable handle is provided with a protruding shaft, and the linkage block is arranged on a movement path of the protruding shaft along with opening of the movable handle.

11. The pipe expanding plier according to claim 9, wherein a side of the first cavity proximate to the movable handle is fixed with a sealing plate, a gap for the linkage block to act is reserved between the sealing plate and the first cavity, the rotating shaft connecting block is hinged with the movable handle by a pin shaft, the rotating shaft connecting block is provided with a movable groove, and the rotating shaft is provided with a limiting block which is connected in the movable groove.

12. The pipe expanding plier according to claim 9, wherein the mounting base is provided with a second cavity, another end of the pushing cone is provided with a tip cone, the pipe expanding head is connected to an outer wall of the second cavity, the tip cone is located in the second cavity, and the tip cone moves between the pipe expanding head and the mounting base along with rotation of the movable handle.

13. The pipe expanding plier according to claim 12, wherein the pipe expanding head comprises a connecting seat and at least two pipe expanding elements, the connecting seat being connected to the outer wall of the second cavity, an annular positioning groove being provided on the connecting seat, and an annular elastic element being provided in the annular positioning groove, and the at least two pipe expanding elements being movably connected to an inner periphery of the annular positioning groove respectively, and the annular elastic element being circumferentially disposed on the at least two pipe expanding elements.

14. The pipe expanding plier according to claim 9, wherein the turntable reset element is a compression spring, one end of the compression spring abutting against the reset block, and the other end of the compression spring abutting against the inner wall of the first cavity.

15. The pipe expanding plier according to claim 9, wherein the turntable reset element is a torsion spring, the torsion spring being sleeved on the rotating shaft, one end of torsion spring being connected to the mounting base, and the other end of torsion spring being cooperated with the reset block.

* * * * *